US009796081B2

(12) United States Patent
Kumar et al.

(10) Patent No.: US 9,796,081 B2
(45) Date of Patent: Oct. 24, 2017

(54) ROBOTIC SNAKE

(71) Applicant: Tata Consultancy Services Limited, Mumbai (IN)

(72) Inventors: Swagat Kumar, Noida (IN); Rajashekhar Vachiravelu Saminathan, Kancheepuram (IN)

(73) Assignee: Tata Consultancy Services Limited, Mumbai (IN)

( * ) Notice: Subject to any disclaimer, the term of this patent is extended or adjusted under 35 U.S.C. 154(b) by 0 days.

(21) Appl. No.: 15/061,567

(22) Filed: Mar. 4, 2016

(65) Prior Publication Data
US 2017/0144298 A1  May 25, 2017

(30) Foreign Application Priority Data
Nov. 25, 2015  (IN) .......................... 4420/MUM/2015

(51) Int. Cl.
*G05G 11/00* (2006.01)
*B25J 9/06* (2006.01)
*B25J 18/06* (2006.01)

(52) U.S. Cl.
CPC ............... *B25J 9/065* (2013.01); *B25J 18/06* (2013.01)

(58) Field of Classification Search
CPC .......... B25J 9/0075; B25J 9/065; B25J 17/00
See application file for complete search history.

(56) References Cited

U.S. PATENT DOCUMENTS

| 6,116,844 A | 9/2000 | Hayward |
| 8,571,711 B2 * | 10/2013 | Jacobsen ................. B08B 9/045 180/9.21 |
| 2003/0229420 A1 * | 12/2003 | Buckingham ........ A61B 1/0055 700/245 |

(Continued)

FOREIGN PATENT DOCUMENTS

WO    WO 2005046943 A2    5/2005

OTHER PUBLICATIONS

Hopkins et al., "Design and Modeling of a New Drive System and Exaggerated Rectilinear-Gait for a Snake-Inspired Robot", http://terpconnect.umd.edu/~skgupta/Publication/JMR2014_Hopkins_draft.pdf), *ASME* Journal of Mechanisms and Robotics, 6(2):021001, pp. 1-16, (2014).

(Continued)

*Primary Examiner* — Zakaria Elahmadi
(74) *Attorney, Agent, or Firm* — Finnegan, Henderson, Farabow, Garrett & Dunner LLP

(57) ABSTRACT

A robotic snake comprising a plurality of friction anchors, a plurality of segments and a plurality of servo motors are disclosed. Each of the plurality of segments includes a first link and a second link connected at a first joint, a third link connected to the first link at a second joint, a fourth link connected to the second link at a third joint, a fifth link connected to the third link at a fourth joint. The simultaneous rotation of third link and fourth link of each of the plurality of segments results in a translational movement and/or a rotational movement. A plurality of servo motors is configured to rotate plurality of joints. The fifth link of one segment and first link of next segment of the each of the plurality of segments act as a quaternary link serially connects each of the plurality of segments.

6 Claims, 8 Drawing Sheets

(56) References Cited

U.S. PATENT DOCUMENTS

| | | | | |
|---|---|---|---|---|
| 2005/0099254 A1* | 5/2005 | Ohnstein | | B08B 9/045 335/220 |
| 2006/0156851 A1* | 7/2006 | Jacobsen | | B25J 18/06 74/490.01 |
| 2006/0269387 A1* | 11/2006 | Yamaguchi | | B08B 9/045 414/729 |
| 2008/0302200 A1* | 12/2008 | Tobey | | B25J 5/007 74/490.02 |
| 2009/0012648 A1* | 1/2009 | Buckingham | | B25J 9/06 700/260 |
| 2009/0095112 A1* | 4/2009 | Buckingham | | B25J 9/06 74/490.05 |
| 2010/0116080 A1* | 5/2010 | Pistor | | A61B 1/0055 74/490.05 |
| 2010/0234988 A1* | 9/2010 | Buckingham | | B25J 18/06 700/245 |
| 2013/0090763 A1* | 4/2013 | Simaan | | A61B 5/11 700/258 |
| 2014/0260755 A1* | 9/2014 | Dong | | B25J 18/06 74/490.04 |
| 2014/0371764 A1* | 12/2014 | Oyola | | B25J 18/06 606/130 |
| 2015/0082935 A1* | 3/2015 | Cibert | | B25J 9/0075 74/490.05 |
| 2015/0321348 A1* | 11/2015 | Rollinson | | B25J 9/065 700/253 |
| 2016/0016319 A1* | 1/2016 | Remirez | | B25J 18/06 74/490.04 |

OTHER PUBLICATIONS

Liljebäck et al., "Modular pneumatic snake robot 3d modelling, implementation and control", http://brage.bibsys.no/xmlui/bitstream/handle/11250/263834/IFAC+2005+-+Modular+Pneumatic+Snakerobot+-+3D+Modelling,+Implementation+and+Control.pdf?sequence=3, 6 pages, (2005).

Andreas et al., "Developments in Snake Robot Modeling and Locomotion", https://www.researchgate.net/profile/Aksel_Transeth/publication/221145355_Developments_in_Snake_Robot_Modeling_and_Locomotion/links/0046351723ce30144e000000.pdf, 9 pages, (2006).

* cited by examiner

ROBOTIC SNAKE

PRIORITY CLAIM

This U.S. patent application claims priority under 35 U.S.C. §119 to India Application No. 4420/MUM/2015, filed on 25 Nov. 2015. The entire content of the aforementioned application are incorporated herein by reference.

TECHNICAL FIELD

The embodiments herein generally relate to a robotic snake, and more particularly, to the two degree of freedom (2 DOF) robotic snake enabled to exhibit rectilinear, sidewinding and turning motion.

BACKGROUND

In the current scenario, robotic snake have several useful applications in infrastructure monitoring, security and surveillance, repair and maintenance, under water exploration etc. For useful implementation of the robotic snake, it is necessary that the robotic snake exhibit different kinds of movements.

Various types of robotic snakes are existing in the prior art using different number of joint mechanisms to exhibit different motions. These joint mechanisms may exhibit one, two or three degrees of freedom (DOF) of motion. They are further classified into different types joint mechanism depending on the kind of joints used.

Existing 2 DOF joint mechanisms are further classified into various types—A, B, C and D depending on the kind of joints used. In an example, type A mechanism use a series of universal joints to produce 2 DOF motion. In another example, type B snake robots use a series of 1 DOF revolute joints that are oriented 90* with each other. The type C consists of joints that bend using oblique rotational axis to the roll axis. The 2 DOF joint mechanism having a rotational and a translational degree of freedom is referred to as a type D mechanism.

In another example existing 2 DOF joint mechanism use rotational degree of freedom and exhibits lateral undulations to move forward cannot exhibit a true rectilinear motion which is essential while moving in confined areas. There are a few joint mechanisms that use rotational as well as translational degree of freedom to achieve rectilinear motion along with other motions like turning. In one of the example, a robotic snake has 7 links and 8 joints (5 revolute and 3 prismatic) which are actuated by two servo motors produces rectilinear and turning The existing robotic snakes are complex and require several number of joints to exhibit one or two types of motion.

Various other robotic mechanism have been explained in the prior but there is a need to provide a robotic snake with lesser number of joints and 2 DOF joint mechanism which is able to exhibit three types of motion i.e. rectilinear, sidewinding and turning motion.

SUMMARY

The following presents a simplified summary of some embodiments of the disclosure in order to provide a basic understanding of the invention. This summary is not an extensive overview of the invention. It is not intended to identify key/critical elements of the invention or to delineate the scope of the invention. Its sole purpose is to present some embodiments of the invention in a simplified form as a prelude to the more detailed description that is presented below. In view of the foregoing, an embodiment herein provides a robotic snake, and more particularly, to the two Degree of Freedom (2 DOF) robotic snake enabled to exhibit rectilinear, sidewinding and turning motion.

One of the preferred embodiments of the present invention comprises a robotic snake comprising a first friction anchor; a second friction anchor; a plurality of segments, wherein the plurality of segments connected between the first friction anchor and the second friction anchor, each of the plurality of segments comprising a first link and a second link, wherein the first link and the second link are connected at a first joint; a third link, wherein the third link is connected to the first link at a second joint; a fourth link, wherein the fourth link is connected to the second link at a third joint; a fifth link, wherein the fifth link is connected to the third link at a fourth joint and the fourth link at a fifth joint and wherein the fourth link is configured to rotate along the fourth joint, and the third link is configured to rotate along the fifth joint. Further, the simultaneous rotation of third link and fourth link of each of the plurality of segments results in at least one of a translational movement and a rotational movement of robotic snake. In addition, a plurality of servo motors configured to rotate the first joint, second joint, and third joint of each of the plurality of segments, and wherein the fifth link of one segment and first link of next segment of each of the plurality of segments act as a quaternary link connects each of the plurality of the segments and wherein the quaternary link act as a holder for the plurality of servo motors.

These and other aspects of the embodiments herein will be better appreciated and understood when considered in conjunction with the following description and the accompanying drawings. It should be understood, however, that the following description, while indicating preferred embodiments and numerous specific details thereof, are given by way of illustration. The summary is not intended to identify essential features of the claimed subject matter nor s it intended for use in determining or limiting the scope of the claimed subject matter. Changes and modifications may be made within the scope of the embodiments herein.

BRIEF DESCRIPTION OF THE DRAWINGS

The embodiments herein are better understood from the following detailed description with reference to the drawings, in which.

DETAILED DESCRIPTION

Figure 1:
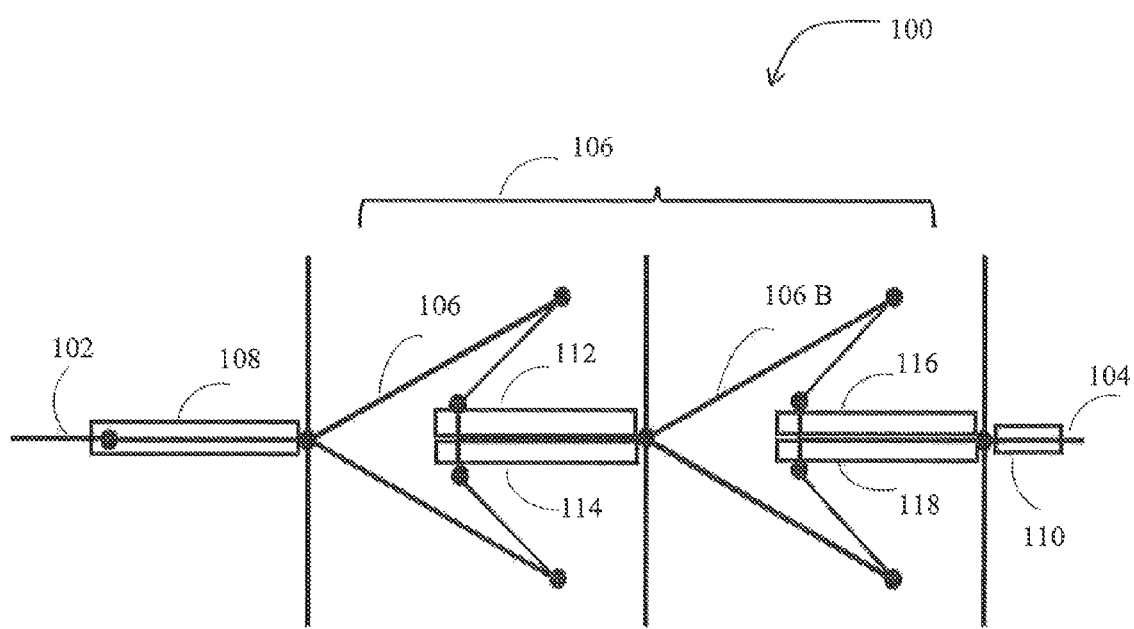
FIG. 1 illustrates a schematic top view of a robotic snake, according to an embodiment of the present disclosure.

The embodiments herein and the various features and advantageous details thereof are explained more fully with reference to the non-limiting embodiments that are illustrated in the accompanying drawings and detailed in the following description. The examples used herein are intended merely to facilitate an understanding of ways in which the embodiments herein may be practiced and to further enable those of skill in the art to practice the embodiments herein. Accordingly, the examples should not be construed as limiting the scope of the embodiments herein.

The words "comprising," "having," "containing," and "including," and other forms thereof, are intended to be equivalent in meaning and be open ended in that an item or items following any one of these words is not meant to be an exhaustive listing of such item or items, or meant to be limited to only the listed item or items.

It must also be noted that as used herein and in the appended claims, the singular forms "a" "an," and "the" include plural references unless the context clearly dictates otherwise. Although any systems and methods similar or equivalent to those described herein can be used in the practice or testing of embodiments of the present disclosure, the preferred, systems and methods are now described.

It is also to be understood that the terminology used in the description is for the purpose of describing the particular versions or embodiments only, and is not intended to limit the scope of the present invention which will be limited only by the appended claims.

Some embodiments of this disclosure, illustrating all its features, will now be discussed in detail. The disclosed embodiments are merely exemplary of the disclosure, which may be embodied in various forms. In the following description for the purpose of explanation and understanding reference has been made to numerous embodiments for which the intent is not to limit the scope of the invention.

Referring now to the drawings, and more particularly to FIG. 1 through 8, where similar reference characters denote corresponding features consistently throughout the figures, there are shown preferred embodiments and these embodiments are described in the context of the following exemplary system and/or method.

FIG. 1 illustrates a schematic top view of a robotic snake 100, according to an embodiment of the present disclosure. The robotic snake involves a two degree of freedom joint mechanism for a snake-like-robot. Each joint mechanism is capable of rotating and translating which in turn enables the robotic snake 100 to exhibit three kinds of gaits rectilinear, sidewinding and turning on a flat surface. The joint mechanism uses a double actuated five-bar mechanism with only revolute joints to exhibit 2 DOF motion for each segment.

As shown in FIG. 1, the robotic snake 100 includes a first friction anchor (102), a second friction anchor (104), a plurality of segments (106) and a plurality of servo motors (108-118). The robotic snake 100 is configured to provide rectilinear and translational motion. The two degree of freedom (2 DOF) robotic snake 100 enabled to exhibit rectilinear, sidewinding and turning motion.

The friction anchors (102 and 104) are present at both the ends of the robotic snake 100 to provide stability during motion while moving on a flat surface. The friction anchors (102 and 104) provide a semi-circular hollow cylinder-like structure with rubber linings on their external surface for a better grip. The two friction anchors (102 and 104) shift between ON state and OFF state. If the friction anchors (102 or 104) are 'ON' state, the friction anchors (102 or 104) make contact with the floor to provide stability position where friction is induced on the floor through physical contact. Similarly, if the friction anchors (102 or 104) are 'OFF' state, the friction anchors (102 or 104) do not make any contact with the floor, the reason being at an 'OFF' state where no friction is induced on to the floor. The friction anchors (102 and 104) are utilized to lift body segments to exhibit a push or pull effect which helps in generating different kinds of motion.

Figure 2:
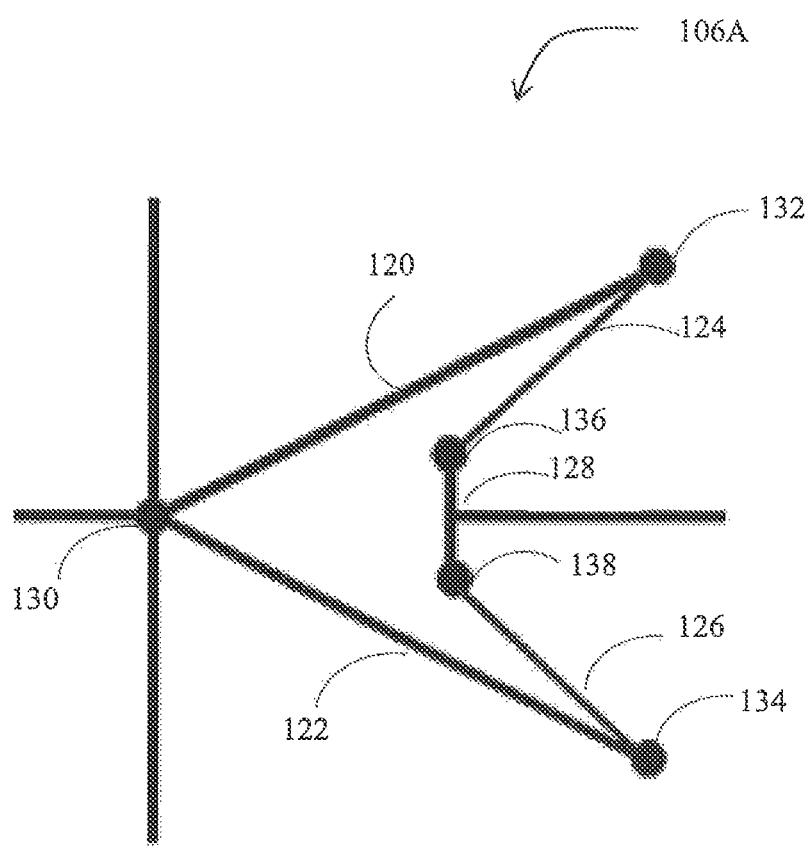
FIG. 2 illustrates one of the plurality of the segments of the robotic snake shown in FIG. 1 (106 A) having five links and five joints, according to an embodiment of the present disclosure.

The robotic snake 100 includes one or more segments numbered as 106A, 106B . . . 106N. For the sake of clarity in the current disclosure, one or more segments will be referred by numeral 106 or 106A. FIG. 2 illustrates one of the plurality of the segments (106A) of the robotic snake 100 shown in FIG. 1, having five links and five joints, according to an embodiment of the present disclosure. As shown in FIG. 2 one of the plurality of the segments 106A includes a first link 120 and a second link 122 connected at a first joint 130 and a third link 124 connected to the first link 120 at a second joint 132. Further, fourth link 126 is connected to the second link 122 at a third joint 134. Furthermore, a fifth link 128 is connected to the third link 124 at a fourth joint 136 and the fourth link 126 at a fifth joint 138.

Figure 3:
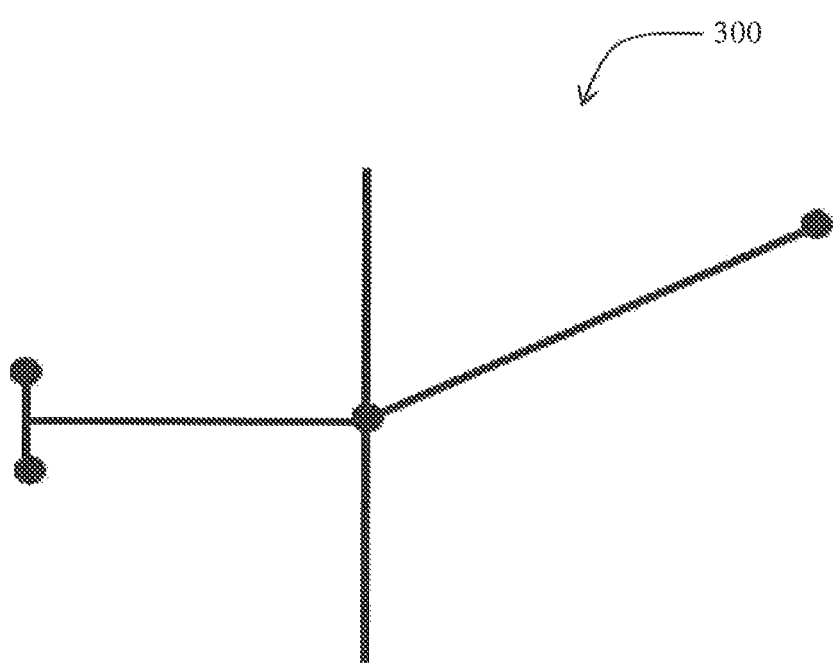
FIG. 3 illustrates a quaternary shape link of each of the plurality of the segments of the robotic snake, according to an embodiment of the present disclosure.

FIG. 3 illustrates a quaternary shape link of each of the plurality of segments of the robotic snake, according to an embodiment of the present disclosure. As shown in FIG. 3 the quaternary link 300 acts as a holder for the plurality of servo motors (108-118) and serially connects each of the plurality of segments 106A with next segment 106B . . . 106N. In an embodiment, the first link 120 of each of the plurality segments and fifth link 128 of each of the plurality of segments act as a quaternary link 300.

In an embodiment, a first servo motor 108 of the plurality of servo motors is connected to the first friction anchor 102 and a second servo motor 110 of the plurality of servo motors is connected to the second friction anchor 104. The first servo motor 108 and the second servo motor 110 exhibit push or pull movement of the robotic snake 100 to exhibit different types of gaits. The third servo motor 112 of the plurality of servo motors is connected to the third link 124 at the fourth joint 136 of each of the plurality of segments 106A and wherein a fourth servo motor 114 of the plurality of servo motors is connected to the fourth link 126 at fifth joint 138 of each of the plurality of segments 106A of robotic snake actuates the fourth joint 136 and fifth joint 138 and third link 124 and fourth link 126 to produce 2 degree of freedom motion (2 DOF).

In an alternative embodiment, the fifth servo motor 116 of the plurality of servo motors is connected to the third link 124 at the fourth joint 136 of each the plurality of segments 106B and wherein a sixth servo motor 118 of the plurality of servo motors (108-118) is connected to the fourth link 126 at fifth joint 138 of each of the plurality of segments 166E of robotic snake 100.

The number of degrees of freedom for the mechanism can be calculated using Gruubler criterion equation given below:

$$F=\lambda(n\_l-n\_j-1)+\Sigma_i fi \quad (1)$$

where, $n_l$ are the number of links, $n_j$ number of joints, $\lambda$ the number of degrees of freedom, fi the number of degrees of motion permitted by the joint i.

As an exemplary illustration, $n_j$=5; $n_l$=5; $\lambda$=3 and $\Sigma_i$ fi=5. By substituting these values into the above equation, we can show that the proposed joint mechanism provides a two degree of freedom motion for each segment which gives rise to a 2 degree of freedom motion.

In an embodiment, the simultaneous rotation of third link 124 and fourth link 126 of each of the plurality of segments at an angle results in at least one of a translational movement and a rotational movement of robotic snake 100. The third servo motor 112 and the fourth servo motor 114 are hosted at the fifth link 128 actuates each of the plurality of segments results in at least one of a translational movement and a rotational movement of robotic snake 100.

Figure 4:
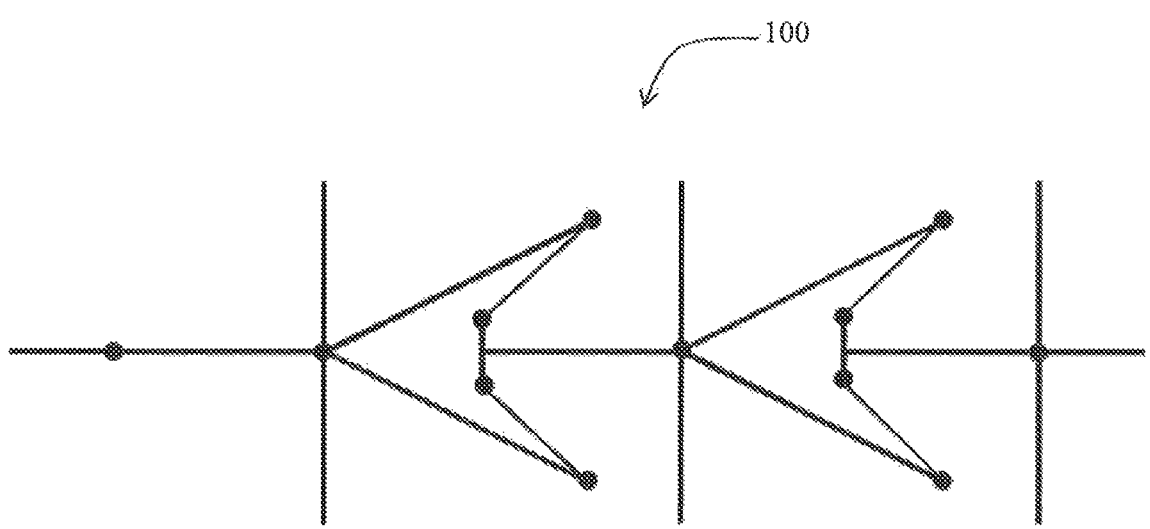
FIG. 4 illustrates the translational movement of the robotic snake in a contracted position, according to an embodiment of the present disclosure.
Figure 5:
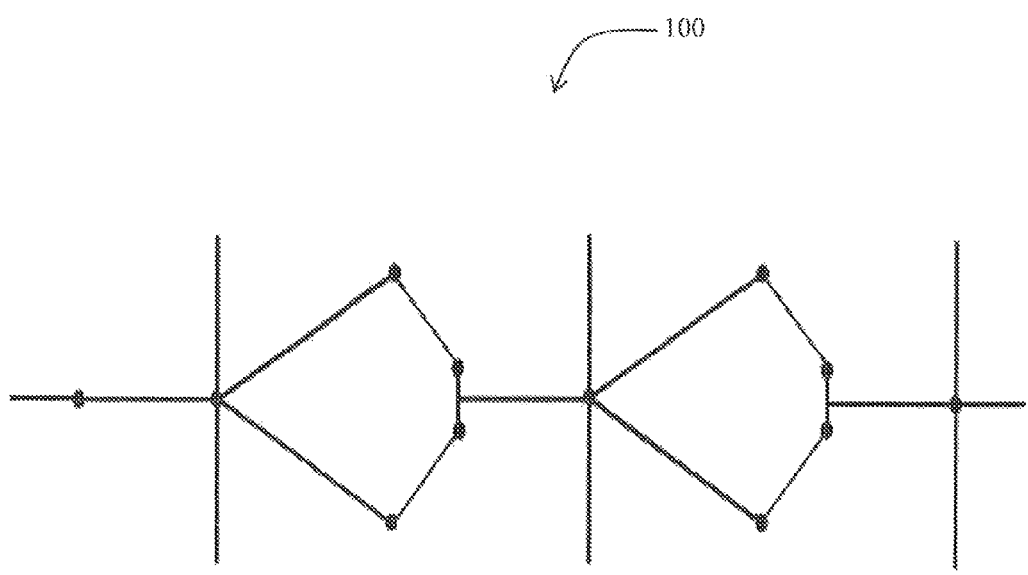
FIG. 5 illustrates the translational movement of the robotic snake in an extended position, according to an embodiment of the present disclosure.

FIG. 4 illustrates the translational movement of the robotic snake 100 in a contracted position, according to an embodiment of the present disclosure. FIG. 5 illustrates exemplary image of robotic snake 100 in translational movement in extended position, according to an embodiment of the present disclosure.

Figure 6:
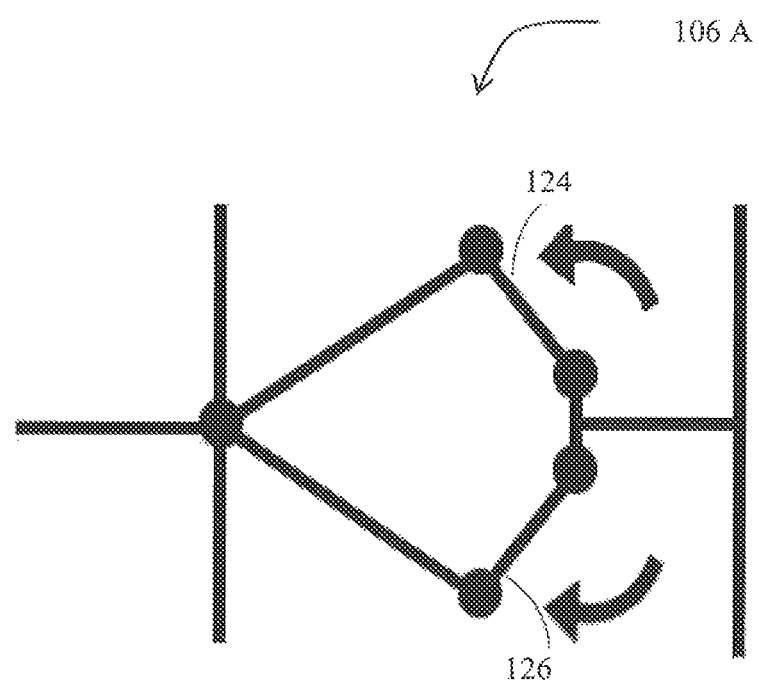
FIG. 6 illustrates the translational movement in extended position of one of the plurality of the segments of the robotic snake show in FIG. 1 (106 A), according to an embodiment of the present disclosure.

FIG. 6 illustrates the translational movement in extended position of one of the plurality of the segments of the robotic snake 100 as shown in FIG. 1 (106 A), according to an embodiment of the present disclosure. In an embodiment, the translational movement in extended position where the third link 124 move in anticlockwise direction and the fourth link 126 move in clockwise direction results in rectilinear motion.

Figure 7:
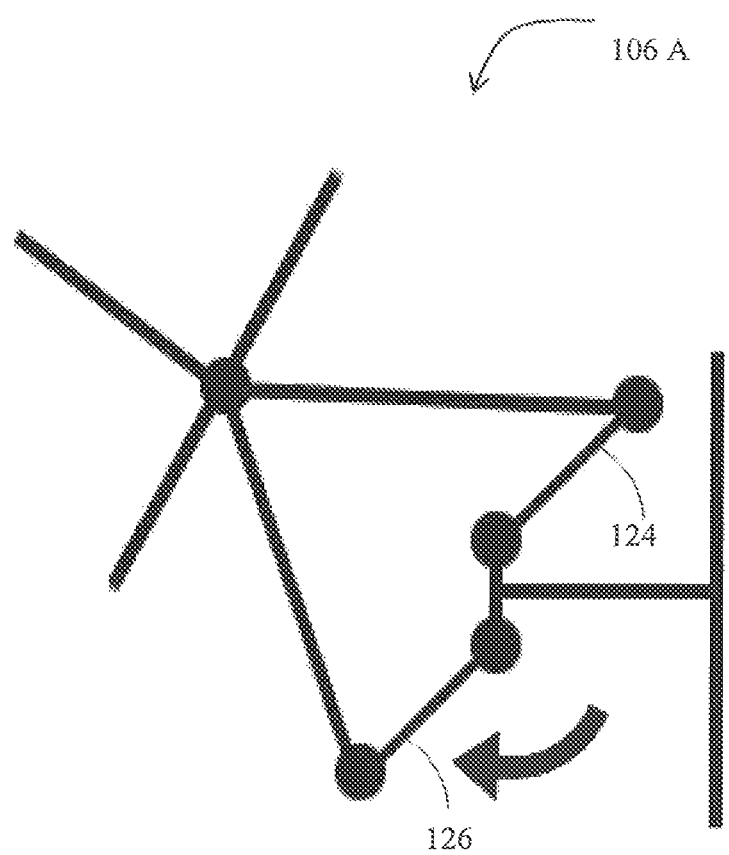
FIG. 7 illustrates the rotational movement of one of the plurality of the segments of the robotic snake show in FIG. 1 (106 A) turning towards right direction, according to an embodiment of the present disclosure.

In an embodiment, the rotational movement results side-winding and turning motion. The turning motion is essential when the robotic snake 100 has to traverse through a curved path. FIG. 7 illustrates the rotational movement of one of the plurality of the segments of the robotic snake as shown in FIG. 1 (106A) turning towards right direction, according to an embodiment of the present disclosure. In an embodiment as shown in FIG. 7 the fourth link 126 is rotated in clockwise direction holding the third link 124 at its initial position enables right turning motion.

Figure 8:
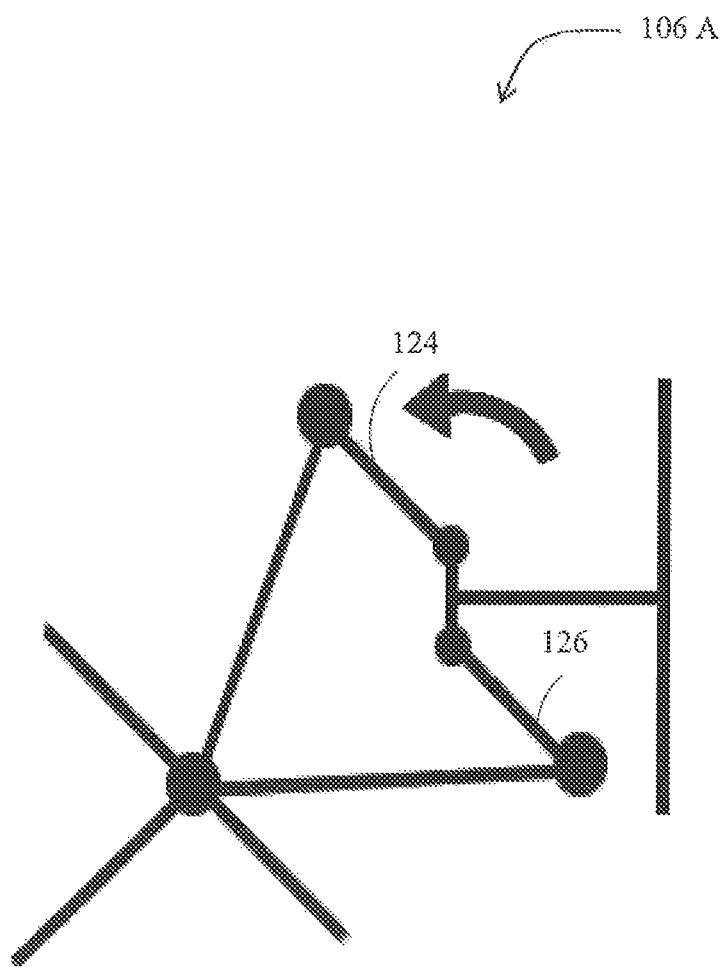
FIG. 8 illustrates the rotational movement of one of the plurality of the segments of the robotic snake show in FIG. 1 (106 A) turning towards left direction, according to an embodiment of the present disclosure.

FIG. 8 illustrates the rotational movement of one of the plurality of the segments of the robotic snake as shown in FIG. 1 (106 A) turning towards left direction, according to an embodiment of the present disclosure. As shown in FIG. 8 the third link 124 is rotated in anticlockwise direction whereas the fourth link 126 is held stationary at its initial position enables left turning motion.

The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments.

It is intended that the disclosure and examples be considered as exemplary only, with a true scope and spirit of disclosed embodiments being indicated by the following claims.

What is claimed is:

1. A robotic snake (100) comprising:
   a first friction anchor (102);
   a second friction anchor (104);
   a plurality of segments (106), wherein the plurality of segments (106) connected between the first friction anchor (102) and the second friction anchor (104), each of the plurality of segments (106A, 106B . . . 106N) comprising:
   a first link (120) and a second link (122), wherein the first link (120) and the second link (122) are connected at a first joint (130);
   a third link (124), wherein the third link (124) is connected to the first link (120) at a second joint (132);
   a fourth link (126), wherein the fourth link (126) is connected to the second link (122) at a third joint (134);
   a fifth link (128), wherein the fifth link (128) is connected to the third link (124) at a fourth joint (136) and the fourth link (126) at a fifth joint (138) and wherein the fourth link (126) is configured to rotate along the fourth joint (136), and the third link (124) is configured to rotate along the fifth joint (138), and wherein the simultaneous rotation of third link (124) and fourth link (126) of each of the plurality of segments (106) results in at least one of a translational movement and a rotational movement of robotic snake;
   a plurality of servo motors (108-118), wherein the plurality of servo motors (108-118) configured to rotate the first joint (130), second joint (132), and third joint (134) of each of the plurality of segments (106), and wherein the fifth link (128) of one segment and first link 120 of next segment of each of the plurality of segments act as a quaternary (300) link serially connects each of the plurality of the segments (106) and wherein the quaternary link (300) act as a holder for the plurality of servo motors (108-118), wherein a third servo motor (112) of the plurality of servo motors (108-118) is connected to the third link (124) at the fourth joint (136) of each of the plurality of segments (118) and wherein a fourth servo motor (114) of the plurality of servo motors is connected to the fourth link (126) at fifth joint (136) of each of the plurality of segments (106) of robotic snake.

2. The robotic snake of claim 1, wherein a first servo motor (108) of the plurality of servo motors (108-118) is connected to first friction anchor (102) and wherein a second servo motor (110) of the plurality of servo motors (108-118) is connected to second friction anchor (104).

3. The robotic snake of claim 2, wherein the first servo motor (108) and second servo motor (110) exhibit push or pull movement of robotic snake.

4. The robotic snake of claim 1, wherein the third servo motor (112) and the fourth servo motor (114) are hosted at the fifth link (128) actuates fourth joint (136) and fifth joint (138) of each of the plurality of segments (106) results in at least one of a translational movement and a rotational movement of robotic snake.

5. The robotic snake of claim 1, wherein the translational movement results rectilinear motion wherein the third link (124) move in anticlockwise direction and wherein the fourth link (126) move in clockwise direction.

6. The robotic snake of claim 1, wherein the rotational movement results sidewinding and turning motion wherein the third link (124) is rotated in anticlockwise direction whereas the fourth link (126) is held stationary at its initial position enables left turning motion and wherein the fourth link (126) is rotated in clockwise direction whereas holding the link third link (124) at its initial position enables right turning motion.

\* \* \* \* \*